Figure 1:
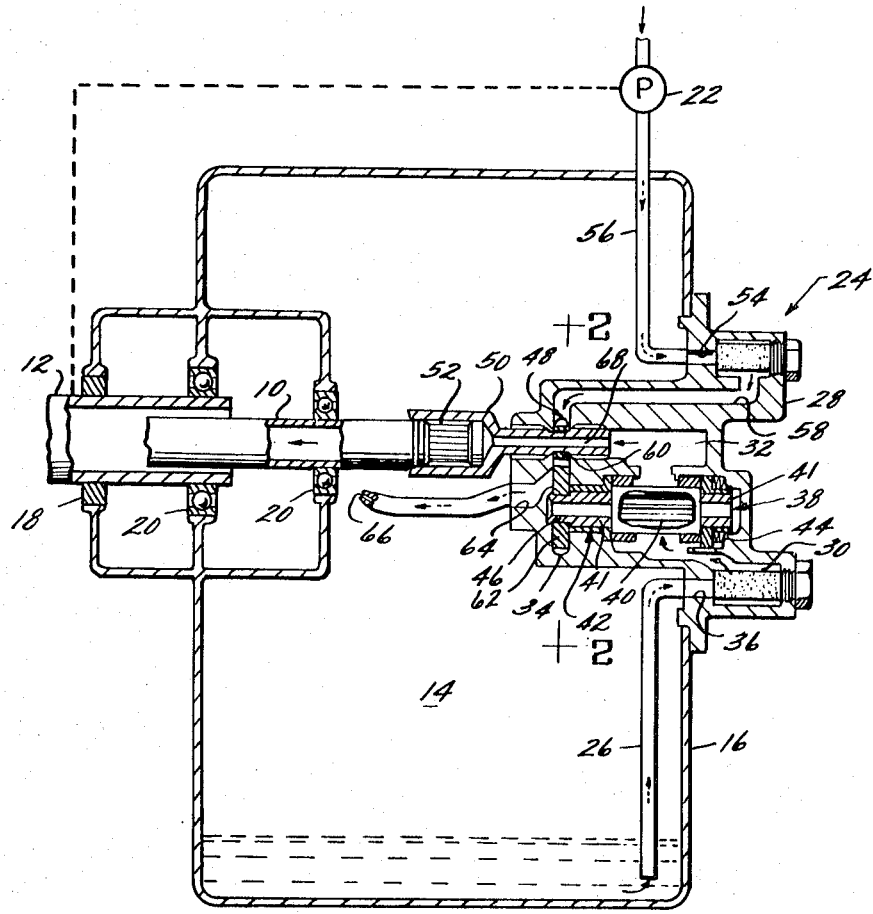

United States Patent

[11] 3,618,710

| [72] | Inventors | Carroll W. DeLisse;<br>James I. Long, both of Cincinnati, Ohio |
|---|---|---|
| [21] | Appl. No. | 162 |
| [22] | Filed | Jan. 2, 1970 |
| [45] | Patented | Nov. 9, 1971 |
| [73] | Assignee | General Electric Company |

[54] METERING AND SCAVENGE PUMP
6 Claims, 2 Drawing Figs.

[52] U.S. Cl. ................................................ 184/6.11,
184/31, 418/206
[51] Int. Cl. .................................................. F16n 13/18,
F01m 1/02
[50] Field of Search .......................................... 184/6, 6
TT, 6 TS, 31; 60/39.08, 39.16; 418/88, 200, 205,
206, 209; 417/205

[56] References Cited
UNITED STATES PATENTS

| 1,083,329 | 1/1914 | Lancia | 184/31 X |
| 1,119,972 | 12/1914 | Machlet | 418/91 |
| 1,669,050 | 5/1928 | Grant | 418/206 X |
| 2,009,137 | 7/1935 | Kleckner | 184/6 TT |
| 2,439,521 | 4/1948 | Miller | 184/6 TT |
| 2,995,211 | 8/1961 | Cohen | 184/6 TT |

*Primary Examiner*—Manuel A. Antonakas
*Attorneys*—Derek P. Lawrence, Erwin F. Berrier, Jr., Lee H. Sachs, Frank L. Neuhauser, Oscar B. Waddell and Joseph B. Forman ABSTRACT: A metering and scavenge pump having scavenge pump means adapted to be driven by a first shaft of a dual-shafted gas turbine engine through speed-reducing means. The speed-reducing means is adapted to function as a pump to meter lubricant which has been pressurized by a supply pump, driven by the other shaft, into the sump cavity so as to establish a fixed relationship between lubricant flow into and out of the sump cavity and prevent undue accumulation of lubricant in the sump without oversizing the scavenge pump. An axial passageway is provided through the drive shaft of the speed-reducing means to direct scavenged lubricant internally of said first shaft.

PATENTED NOV 9 1971 3,618,710

INVENTORS.
JAMES I. LONG
CARROLL W. DeLISSE
BY

Erwin F Barrier Jr.
ATTORNEY

METERING AND SCAVENGE PUMP

This invention relates to lubrication systems and, more particularly, to an improved metering and scavenge pump which is especially adapted for use in a gas turbine engine lubrication system.

In gas turbine engines, the rotor shaft bearings are generally housed within sump cavities and lubricated and cooled by oil or other suitable fluid which is sprayed into the sump by suitable nozzles, scavenged and then delivered to other lubrication system elements such as deaerators, filters, heat exchangers, and the like for reconditioning before repumping or recycling such fluid to the sump cavity. In such arrangements, it is usually necessary or desirable to prevent undue accumulation of oil in the sump cavity which might result in oil overheating, high oil contamination levels or overpressurization of the sump cavity. To this end, it is customary to provide a sump or scavenge pump for forcibly returning the lubricant to the lubrication system. Where, however, the scavenge pump operates independently of the lubrication system supply pump, such as in a dual-rotor turbofan engine where the scavenge pump and the lube supply pump are driven by different rotors, the scavenge pump must be oversized in order to assure an excess of scavenge pump volume over the lube supply volume throughout the operating regime of the engine.

A further problem is encountered in such systems when the scavenged lubricant is to be ducted through one of the engine rotor shafts.

One object of the present invention is a fluid pump of simplified and economical construction which is adapted to provide metered flow into and from a sump cavity.

Another object of this invention is a gear pump for metering fluid into a compartment and a vaned-type scavenge pump for siphoning fluid from the compartment, with the former adapted to act as a speed reducer drive for the latter.

Yet another object of this invention is a combined metering and scavenge pump, as above, which is adapted to discharge scavenged fluid through its drive shaft.

A further object of this invention is an improvement for bearing sump cavity lubrication systems of the type having lube supply and scavenge pumps driven by independently rotatable shafts of a gas turbine engine.

Briefly stated, the above and other objects, which will become apparent upon reading the following description of the preferred embodiment, are achieved in the present invention by providing a housing carrying scavenge pump means and speed-reducing drive means for connecting the scavenge pump means to a gas turbine engine rotor shaft. The speed-reducing drive means is adapted to function as a gear pump and meter fluid therethrough. In accordance with a further aspect of this invention, an improved lubrication system for a dual-shafted gas turbine engine, having a lube supply pump driven by one shaft and the scavenge pump means driven by the other shaft, is provided wherein the output from the lube supply pump is connected in series with the gear pump so as to meter lubricant into the sump cavity as a fixed function of or generally in direct proportion to lubricant scavenged from the sump cavity to thereby prevent accumulation of lubricant without oversizing the scavenge pump means. The outlet of the scavenge pump means is preferably formed through the drive shaft of the speed-reducing drive means so as to direct scavenged lubricant internally of the gas turbine engine shaft driving the scavenge pump means.

Figure 2:
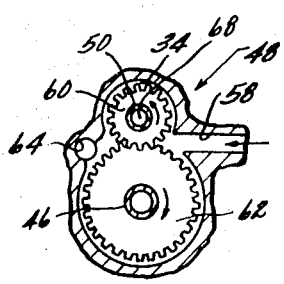

While the specification concludes with claims particularly pointing out and distinctly claiming the subject matter of this invention, it is believed that the invention will be better understood upon reading the following description of the preferred embodiment in connection with the accompanying drawings wherein:

FIG. 1 is a cross-sectional view diagrammatically showing a portion of a gas turbine engine bearing sump cavity employing an exemplary embodiment of the pump and lubrication system of this invention; and FIG. 2 is a cross-sectional view taken along lines 2—2 of FIG. 1.

Referring now to the drawings and particularly to FIG. 1, a bearing sump cavity for a gas turbine engine of the well-known type including independently rotatable inner and outer or low and high pressure concentric rotor shafts 10 and 12, respectively, is shown at 14 as being formed by suitable stationary engine structure 16 and a shaft seal 18.

Bearing means have been shown generally at 20, journaling shafts 10 and 12 and supported by engine structure 16 in a well-known manner.

To supply lubricant to the sump chamber 14 for lubrication and cooling of the bearings 20 or other elements normally housed within such a sump cavity, a pump 22, in driving connection with the outer shaft 12, is provided to receive a flow of lubricant from a suitable source (not shown).

A scavenge pump shown generally at 24 in FIG. 1 and driven by the inner shaft 10 is provided to scavenge lubricant from the sump cavity 14 through a conduit 26 so as to prevent excessive accumulation of lubricant within the sump cavity 14 which might result in overheating of the lubricant, a high contamination level and/or overpressurization and, hence, leakage from the sump cavity.

In the lubrication system arrangement of FIG. 1, wherein the lubrication supply pump 22 and the scavenge pump 24 are driven by independently rotatable high and low pressure turbine shafts 12 and 10, respectively, it has in the past been customary to oversize the scavenge pump 24 so as to ensure that the pumping capacity of the scavenge pump is equal to or exceeds the pumping capacity of the lube supply pump 22 throughout most, if not all, of the operating range of the gas turbine engine, it being recognized that the relative rotational speed of the rotors 10 and 12 will vary widely through such operating range.

The present invention overcomes the foregoing necessity of oversizing the scavenge pump, in part, by providing a housing 28 formed with a first chamber 30, a second chamber 32 and a third chamber 34, with the first chamber in flow communication with the conduit 26 through an inlet 36. Pump means 38 are provided between the chambers 30 and 32 for scavenging fluid from the sump cavity 14 and delivering such fluid under pressure to chamber 32 and hence toward the source of supply through a suitable outlet. The pump means 38 is preferably of the rotary vane type and includes rotatable vaned element 40 having a shaft 41 which is suitably journaled for rotation within the housing 28, as at 42 and 44, and has one end 46 projecting into the third chamber 34. It will be appreciated, however, that other suitable rotary gear or screw pump types may be effectively employed.

Speed reduction drive means, shown generally at 48 as including a drive shaft 50, in driving engagement with the inner shaft 10 through a spline or like connecting means 52, are provided to efficiently drive the pump means 38 at a reduced speed relative to the rotation of shaft 10.

To provide metered flow into and out of the sump cavity 14, notwithstanding the fact that lube pump 22 is driven by independently rotatable shaft 12, the output from pump 22 is directed to an inlet port 54 through a suitable conduit 56, and hence through a passageway 58 formed in the housing 28 to one side of the speed reduction drive means 48. The speed reduction drive means preferably comprises a first spur gear 60 fixedly secured to the drive shaft 50 in meshed engagement with a pinion gear 62 which, in turn, is fixedly secured to the end 46 of the scavenge element shaft 41 as best shown in FIG. 2. An outlet passage 64 is formed in the housing 28 to communicate the other side of chamber 34 with a spray nozzle 66 for delivery of the lubricant into the sump cavity. The chamber 34 is sized in cooperation with gears 60, 62 so that the speed-reducing drive means 48 operates as a gear pump to pump and thereby meter the required lubricant from the inlet port 54 to the nozzle 66 as a function of the speed of inner shaft 10 and, hence, as a fixed function of or generally in direct proportion to the scavenge capacity of pump means 38. In this manner, the scavenge pump may be sized with a capacity greater than that of the lubricant supply requirements throughout most, if not all, of the operating range of the gas turbine engine without regard to the relative variations in the speed of rotors 10 and 12. Accordingly, a considerable reduction in system and component weight, size and complexity may be realized.

Where it is desirable, as is the case with the embodiment of FIG. 1, that the scavenged fluid be discharged internally of inner shaft 10, the drive shaft 50 may be formed with an axial passage 68 and the chamber 32 arranged to communicate with such passage so as to provide communication between the chamber 32 and the shaft 10 without necessitating an increase in the number of rotating seals.

While the speed-reducing drive means has been shown as including spur gears, it will be understood that other suitable gear types may be employed. Additionally, although the outlet to chamber 32 has been shown as comprising a passageway 68 formed through the drive shaft 50, it will be appreciated that such outlet may in some instances be formed through the housing 28. Accordingly, while a preferred embodiment of the present invention has been depicted and described, it will be appreciated that such is intended to be exemplary only and not definitive and that many modifications and changes may be made thereto without departing from the fundamental theme of the invention.

What is claimed is:

1. In a lubrication system for a gas turbine engine of the type having independently rotatable first and second rotor shafts and of the type including a lubrication supply pump driven by said first rotor for delivery of lubricant to a bearing sump cavity, and pump means driven by said second rotor shaft for scavenging lubricant from said bearing sump cavity, the improvement comprising:

a housing formed with first, second and third chambers therein, an inlet communicating said first chamber with said sump cavity and an outlet from said second chamber for discharge of scavenged lubricant, said pump means including a rotatable pump element disposed intermediate said first and second chambers for transporting and pressurizing fluid from said first chamber to said second chamber, means, disposed in said third chamber and including a drive shaft for connection with said second rotor, for rotatably driving said pump element at a reduced speed relative to said second rotor, said housing formed with an inlet for said third chamber in series connection with said supply pump and an outlet for said third chamber opening to said sump cavity, with said speed reduction drive means and said third chamber sized and adapted to meter lubricant into said sump cavity as a function of the speed of said second rotor and thereby in fixed relationship to the volume of lubricant scavenged by said pump means.

2. The improved lubrication system of claim 1 further characterized in that said speed reduction means comprise a first gear carried by said drive shaft and a second gear carried by said pump element and in meshed engagement with said first gear.

3. The improved lubrication system of claim 2 further characterized in that said first and second gears are spur gears.

4. The improved lubrication system of claim 1 further characterized in that said second rotor shaft is hollow, said second chamber outlet comprising an axial passageway formed through said drive shaft whereby scavenged lubricant is discharged internally of said second rotor shaft.

5. A pump for use in metering fluid to and scavenging fluid from a sump cavity, said pump comprising:

a housing formed with first, second and third chambers therein, and an inlet for communicating said first chamber with said sump cavity, pump means, including a rotatable pump element disposed intermediate said first and second chambers, for transporting and pressurizing fluid from said first chamber to said second chamber, said rotatable pump element including a shaft projecting into said third chamber, a first gear fixedly carried by said pump element shaft within said third chamber, a drive shaft projecting into said housing and carrying a second gear in driving engagement with said first gear, an inlet and an outlet for said third chamber, with said third chamber and said gears sized and adapted to meter fluid flow between said third chamber inlet and outlet whereby fluid is delivered to said sump cavity as a fixed function of fluid scavenged from said sump cavity, and an outlet for said second chamber comprising an axial passageway formed through said drive shaft, whereby the output of said pump means may be efficiently delivered internally of a hollow rotor coupled to said drive shaft.

6. The pump of claim 5 further characterized in that said first and second gears are spur gears.

* * * * *